United States Patent Office 3,248,352
Patented Apr. 26, 1966

3,248,352
POLYMERIC MATERIALS CONTAINING OXI-
DIZED AMINE RADICALS AND STABLE,
AQUEOUS, WATER-REPELLENCY COMPO-
SITIONS CONTAINING THE SAME
Frank Joseph Marascia and Jerry Allen Nelson, Newark,
and Christian S. Rondestvedt, Jr., Brandywine Hundred,
Del., assignors to E. I. du Pont de Nemours and Com-
pany, Wilmington, Del., a corporation of Delaware
No Drawing. Filed Sept. 8, 1961, Ser. No. 136,726
11 Claims. (Cl. 260—28.5)

This invention relates to novel polymeric materials which possess useful surface active properties and to stable, aqueous water-repellency compositions for commercial fibers obtainable by the aid of said polymeric materials.

It is an object of this invention to provide novel, polymeric materials which are particularly adapted for use as aqueous dispersing agents for waxes, pigments and other water-insoluble materials. A further object is to provide novel water-repellency agents which are adapted to be marketed commercially in the form of stable, aqueous concentrates that can be diluted readily into aqueous treatment baths without flocculation or other practical difficulties. Additional objects and achievements of this invention will become apparent as the description proceeds.

The rendering of textile fiber water-repellent by padding onto it, from dilute aqueous suspension, a physically acting agent such as paraffin wax and silicones is well known.

In copending application of F. J. Marascia and R. E. Johnson, Jr., Serial No. 46,901, now abandoned filed August 2, 1960, marketable, aqueous water-repellency compositions are disclosed and claimed wherein a physically acting agent such as paraffin wax is stabilized in aqueous suspension by the aid of copolymers derived from two principal acrylic acid monomers: A hydrophilic kind, typified by diethylaminoethyl acrylate and its salts or quaternary derivatives, and an organophilic kind, typified by an alkyl ester of acrylic acid.

The actual definitions of these two kinds of agents in said copending application are of a considerably broader character. But for brevity we shall designate here the entire class as nitrogenous, linear, acrylic copolymers, by virtue of the fact that they all contain basic, neutralized or quaternary N-atoms, which come into the copolymer through its hydrophilic component. Furthermore, it will be understood that in the above summary, as well as in all the discussion which follows, we use the words "acrylic" and "acrylate" as a short way of typifying both acrylic and methacrylic, or acrylate and methacrylate, respectively.

Now we have found that the practical characteristics and utility of aqueous water-repellency compositions of the type above discussed can be immensely improved if the indicated cationic, linear arcylic copolymer contains at least part of its N-atoms (say, not less than 6% of the total) in oxidized form. To illustrate this statement with a simple copolymer made up of diethylaminoethyl methacrylate and a neutral alkyl acrylate, the former, according to our invention, should be present in the copolymer, at least in part, in the form of the cationic radical

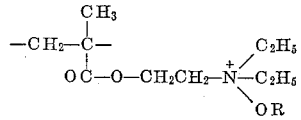

wherein R designates hydrogen, alkyl or aralkyl.

Among the advantageous novel characteristics imparted to the aqueous water-repellency composition by the mentioned modification are the following:

(1) The aqueous wax emulsion becomes stablized to such a high degree that it can be used for making articles water-repellent in a home laundry machine without danger of "gumming out" (that is, depositing gummy residues on parts of the machine). Wax-type emulsions prepared according to said copending application but without the benefit of the instant improvement can be used to advantage in certain textile mill processes, but some of them will gum out to a considerable degree in a home type washing machine, presumably due to a combination of high water-temperature, vigorous agitation, high dilution and considerable pH-variation which attend home laundry practice.

(2) The aqueous water repellency composition becomes applicable both by padding procedure and by exhaust methods to a wide variety of textile fibers, including cotton, hydrophobic synthetic fibers and wool. In contradistinction, aqueous wax emulsions of the hitherto common "Aridex" types (a wax emulsion stabilized principally by aluminum salts) have been known to be applicable to synthetic fiber and wool by exhaust procedure, but only by padding procedure on cotton fiber.

(3) The composition is stable under a very large range of pH values, from extremely acid, through neutral, to moderately alkaline (pH 11).

(4) The novel water-repellency compositions are characterized by a high potency, which factor together with their increased stability enables one to market compositions of lower total organics content than hitherto possible, say compositions of 5% organic content. This is an advantage where low-cost, small packaging for widespread public distribution is intended.

(5) The water-repellency effects produced on textile fiber are more durable to laundering than the effects obtainable by the above referred to "Aridex"-type emulsions.

The needed ratio of polymer to wax may also be lower in our invention than in said copending application; say as low as 1:50.

To shed more light on the subject of exhaustion, treatments of textile fibers with aqueous baths generally proceed under two major categories: Padding and exhaustion.

In padding, a concentrated aqueous bath is generally employed. The fabric is impregnated with the treatment bath and then squeezed until there remains a definite amount of the aqueous liquors in proportion to the weight of the fiber. If, on the other hand, the fiber has a degree of "affinity" for the treating agent, it will generally extract the treating agent from the bath, until the latter becomes essentially exhausted. The quantity of agent absorbed by the fiber is then essentially the entire quantity of agent that had been added to the bath and is independent of the quantity of water picked up by the fiber. In such cases, the quantity of agent initially added to the bath is calculated "O.W.F.," that is: On the weight of the dry fiber.

Padding procedure requires special skill and is generally not economical for use in home laundry machines. Therefore, an agent having exhaust qualities opens up the art of water-repellency treatments to the housewife using a home type washing machine.

At the same time, the novel water-repellency compositions according to this invention can also be applied by padding procedure, practically to any fiber, including textile fibers, leather and paper, where such technique is economically applicable, for instance in a textile mill.

Accordingly, one of the major aspects of this invention is the provision of a marketable, aqueous water-repellency composition comprising a stable, aqueous dispersion of (a) A physically acting water-repellency agent, particularly a natural wax such as paraffin wax, ozokerite or palm wax, or a mixture of such a wax with other natural or synthetic waxes, for instance, beeswax or polyethylene, and (b) An amine-oxidized cationic polymer as more fully defined below, the quantity of total organics in said suspension being from 5 to 50% by weight of the whole, while the ratio of said polymer to the waxy constituent may vary from 1:1 to 1:50.

A second aspect forming an integral part of our invention constitutes the provision of a novel series of cationic polymeric surface-active agents which are made up principally of two types of acrylic ester monomers and contain oxidized amine radicals.

The one type of monomer mentioned is derived from the nitrogenous acrylic compound of the general formula

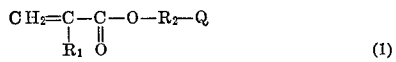 (1)

wherein $R_1$ stands for H or $CH_3$, $R_2$ is a divalent aliphatic radical selected from the group consisting of $C_2H_4$, $C_3H_6$, $C_4H_8$ and

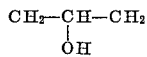

Q is a dialkyl amine radical which contains a total of 2 to 26 C-atoms, or a monoalkyl-monoarylamine radical having a total of 7 to 16 C-atoms, or the radical of a 5-membered or 6-membered heterocyclic compound containing a secondary nitrogen atom, for instance piperidine, morpholine or pyrrolidine.

The second type is derived from monomers which are neutral aliphatic esters of acrylic acids and may be defined broadly by the formula

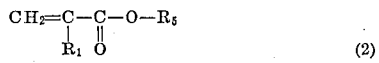 (2)

wherein $R_1$ stands for H or $CH_3$, while $R_5$ is an aliphatic hydrocarbon radical of 1 to 22 C-atoms.

The proportion of the two principal monomers in the copolymer may vary from 10 to 90% by weight of monomer (1) and 90 to 10% by weight of monomer (2). It may, however, contain also minor quantities (say up to 20% by weight) of a third monoolefinic monomer such as styrene, acrylonitrile or vinyl chloride.

The oxidized amine content of the copolymer is achieved by partial or complete conversion of the trivalent N-atoms of monomer (1) into cationic radicals of the form

wherein R is hydrogen or an alkyl or aralkyl radical, by oxidation of the polymer in the presence of acid followed by hydration, alkalization, alkylation or aralkylation. Alternatively and under the special procedure set forth below, the oxidized amine groups may be introduced first into the nitrogenous monomer, through which these groups then find their way into the eventual polymer.

To illustrate the former procedure, a copolymer made up of the two types of monomers (1) and (2) may be synthesized in any convenient manner, using any convenient polymerization initiator or "catalyst" and then subjected to oxidation. For instance, the initiator may be 2,2'-azobisisobutyronitrile, 2,2' - azobisisobutyro - amidine dihydrochloride or potassium persulfate (compare Examples 1, 2 and 7 of said copending application Serial No. 46,901), and the agent for subsequent oxidation may be peroxyacetic acid or any other monoacyl derivative of hydrogen peroxide.

In the alternative process, the monomer defined in Formula 1 may be subjected to oxidation with a monoacylperoxide, as above, following which the N-oxidized monomer thus obtained is fed into a polymerization mass containing monomers of Formulas 1 and 2 above, with a suitable initiator as above mentioned. In this case, obviously, the copolymer contains some N-atoms which have not been oxidized. These may eventually be converted into salt form or quaternary form by acidification, alkylation or aralkylation.

Apart from the above special provisions for introducing cationic

groups into the copolymer, the method of preparing the same may follow known general practice. Thus, taking an alkylaminoalkyl acrylate as typical of the basic monomers defined hereinabove by Formula 1, and taking an alkly acrylate of 1 to 22 C-atoms in the alkyl chain as typical of the neutral aliphatic esters of acrylic and methacrylic acids defined hereinabove by Formula 2, a mixture of 10 to 90 parts by weight of the former and 90 to 10 parts, respectively, of the latter (or else a total of 90 to 10 parts, respectively, of a mixture of monomer (2) with a monoolefinic third component as indicated above) is subjected to polymerization by known methods, in bulk, in organic solvent solution or in an aqueous emulsion.

In the emulsion-polymerization technique, the general procedure is to emulsify the selected mixture of monomers in a water solution of a cationic or nonionic surface active agent; warm up to between 65° and 75° C.; add a polymerization catalyst; and hold the mass at said temperature until polymerization is complete. The latex-like reaction mass is now subjected to oxidation, according to this invention, using a monoacyl derivative of hydrogen peroxide in quantity theoretically equivalent to from 6% to 100% of the available tertiary N-atoms in the copolymer. If acid has not been employed together with the peroxide compound, the mass is now treated with an acid, for instance acetic, sulfuric or phosphoric, in quantity equivalent to the residual amino content of the mass, or in considerable excess, if desired. This operation converts into a salt any amino groups which have not been N-oxidized, and also transforms into a salt some or all of the N-oxidized groups, according to the following typical equation:

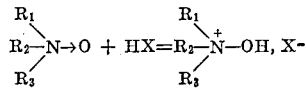

At this stage, the copolymer may be recovered in substance from the latex by coagulation with acetone or methanol, followed by decantation and washing. Where, however, a marketable wax-dispersion is desired for water-repellency purposes, such wax may be incorporated directly into the latex obtained in the oxidation-acidification step, followed by dilution to the desired concentration.

In the solution-polymerization technique, the procedure is to dissolve one part of the selected mixture of monomers in from about 0.25 to 10 parts of an organic liquid or low-melting solid which is a solvent both for the monomers and for the resultant copolymer, convenient illustrations of such organic solvents being paraffin wax, heptane, solvent naphtha, ethanol, t-butyl alcohol, benzene and toluene. To the solution of the monomers a solvent-soluble initiator is added, and the solution is then allowed to polymerize at a temperature from about 25° C. to about 150° C. A solution of a peracid such as peracetic acid in acetic acid is then added, whereby N-oxidation of the copolymer and conversion into a salt are achieved simultaneously. The copolymer is then isolated, as by evaporation of the solvent, and may be used for incorporation together with wax into a marketable aqueous water-repellency composition. If a molten wax has been employed as solvent for the polymerization, isolation of the copolymer is not needed. In this case, the N-oxidized and acidified mass is suitable directly for dispersion in water to provide a marketable water-repellency composition.

In the bulk polymerization the general procedure is to heat the selected mixture of monomers in an inert atmosphere such as nitrogen at a temperature of between 25° and 150° C., in a heavy duty mixer, and in the presence of a free-radical-generating polymerization initiator which is soluble in the monomer mixture. The polymerized mass may then be subjected directly to N-oxidation as detailed hereinabove under the solution-polymerization technique. Or it may be dissolved in a solvent, such as listed in the preceding paragraph, and then N-oxidized as in said paragraph. Or again, it may first be dispersed in water together with the wax, and the dispersion may then be treated with a solution of peracetic acid in acetic acid.

Any convenient water-soluble acid may be employed for the aforementioned acidifications, for instance: hydrochloric, sulfuric, phosphoric, nitric, fluorosilicic, formic, acetic, benzenesulfonic, oxalic, tartaric and the like.

As convenient per-acids for the N-oxidation, may be mentioned peroxyformic, peroxyacetic, peroxytrifluoroacetic, peroxypropionic, peroxybutyric, peroxybenzoic, and monoperoxyphthalic acid. Monopersulfuric acid is also suitable.

Instead of converting the copolymer into a salt, it may be quaternized in the usual manner to give ionizable quaternary derivatives on its nitrogen sites. The procedure, generally, is to dilute the copolymer latex obtained in the emulsion-polymerization procedure and to add to it, at about room temperature, a quantity of the quaternizing agent equal to (or in the case of the dialkyl sulfates, slightly less than) that calculated the quaternize all the tertiary N-atoms in the copolymer, with or without addition of an acid binding agent such as NaOH. Solutions of the copolymer in an organic solvent may also be quaternized in like manner.

As convenient quaternizing agents for the aforegoing procedures may be named dimethyl sulfate, diethyl sulfate, methyl bromide, ethyl iodide, methyl p-toluene-sulfonate, triethyl phosphate, and benzyl chloride.

Instead of forming the copolymer base first and then converting it, as above outlined, into a salt or quaternary compound, one may also proceed by initially selecting part of the nitrogenous monomer (1) in the form of a salt or quaternary derivative and then proceeding with the copolymerization in known manner. The resulting copolymer is then subjected to oxidation of the remaining amino groups in the manner indicated hereinabove.

As suitable initial basic monomers for the purposes of this invention may be named the acrylates and methacrylates of any of the following basic alcohols:

2-dimethylaminoethanol,
2-diethylaminoethanol,
2-dipropylaminoethanol,
2-diisopropylaminoethanol,
2-diisobutylaminoethanol,
2-(N-methyl-N-cyclohexylamino)ethanol,
2-morpholinoethanol,
2-(N-methyl-N-dodecylamino)ethanol,
2-(N-ethyl-N-octadecylamino)ethanol,
2-(N-ethyl-N-2-ethylhexylamino)ethanol,
2-piperidinoethanol,
2-pyrrolidinoethanol,
3-diethylamino-1-propanol,
2-diethylamino-1-propanol,
1-dimethylamino-2-propanol,
4-dimethylamino-1-butanol,
4-diisobutylamino-1-butanol,
1-dimethylamino-2-butanol,
4-diethylamino-2-butanol.

These esters may be prepared as described by Graves in U.S.P. 2,138,763.

As suitable neutral ester monomers of Formula 2 above, especially where the resultant copolymer is intended for use in water-repellency treatments, may be named the acrylates and methacrylates of 1-butanol, 2-butanol, 2-methyl-2-propanol, 3-buten-1-ol, 1-pentanol, 1-hexanol, 3-hexen-1-ol, 1-octanol, 5,5-dimethyl-2-hexen-2-ol, 3-octen-1-ol, 2-ethyl-1-hexanol, 1-dodecanol, 2,6-dimethyl-1-octen-2-ol, 1-hexadecanol, 1-octadecanol, 9-octadecen-1-ol, 1-docosanol, and the like.

As already indicated, the novel, aqueous water-repellency compositions of this invention, are readily dilutable with water, and may be then applied to a wide variety of commercial fibers, including textile fibers, yarns or fabrics and paper, by either padding or exhaust technique. When the exhaust technique is used, the amount of water-repellent composition applied may be calculated to put into the treatment bath from 0.5 to 10% total organics O.W.F. (i.e. based on the weight of the fiber). In the case of paper, wider ranges are applicable.

After application of the diluted treatment bath to the fiber (and squeezing the latter if a padding procedure has been employed), the material is cured by heating to between 100° and 200° C., preferably between 125° and 165° C., for 0.5 minute to 20 minutes, the length of heating varying inversely with the temperature. In home-laundry applications, this heating is achieved automatically and simply by the subsequent ironing of the treated apparel, or by the use of a home laundry drier.

Without limiting this invention the following examples are given to illustrate our preferred mode of operation. Parts mentioned are by weight. Also, wherever peracetic acid solution is mentioned, a solution thereof in acetic acid is meant.

EXAMPLE 1

A. *Preparation of hydroxyammonium derivative of 2-(diethylamino)ethyl methacrylate*

To 185 parts of 2-(diethylamino)ethyl methacrylate, cooled to between 0° and 5° C., are added slowly with agitation 190 parts of a 40% solution of peracetic acid (in acetic acid) while the temperature of the reaction mass is held below 5° C. The 2-(diethylamino)ethyl methacrylate is converted essentially 100% to the hydroxyammonium state and is obtained as a solution in acetic acid. Its picrate, when recrystallized from ethanol, melts at 127.5° to 128.5° C., and its elementray analysis corresponds to the formula $C_{16}H_{22}N_4O_{12}$.

The above acetic acid solution may be used directly in the emulsion copolymerization, with or without neutralization of the acetic acid.

B. *Copolymerization with octadecyl methacrylate and unoxidized base*

| Ingredients: | Parts |
| --- | --- |
| Water | 400 |
| Monopotassium phosphate ($KH_2PO_4$) | 2.7 |
| Sodium hydroxide | 1.2 |
| Octadecyl-trimethyl-ammonium chloride | 9 |
| Octadecyl methacrylate | 140 |
| 2-(diethylamino)ethyl methacrylate | 48 |
| N-oxidized 2-(diethylamino)ethyl methacrylate from part A (in acetic acid solution) | 12 |
| 2,2'-azobis(isobutyramidine) dihydrochloride | 0.4 |

The water is deaerated by boiling under reflux while bubbling a stream of nitrogen through it, and is cooled to between 60° and 65° C. The potassium phosphate, sodium hydroxide, and octadecyl-trimethylammonium chloride are dissolved in the water, and the octadecyl methacrylate and 2-(diethylamino)ethyl methacrylate are added with agitation. 0.2 part of the polymerization initiator dissolved in one part of water is added. When polymerization is initiated, as shown by a temperature rise and the appearance of streaking and a bluish color, the N-oxidized 2-(diethylamino)ethyl methacrylate is fed in gradually over a period of at least 30 minutes. When the rate of polymerization subsides materially, the remainder of the initiator is added, and the polymerization is continued at between 60° and 65° C. until substantially completed (about five hours). The product is a stable, uniform latex.

On the basis of the quantity of N-oxidized monomer fed into the reaction mass, the resulting copolymer is computed to have 20% of its N-atoms in the hydroxy-ammonium form

Similar results are obtained when the same procedure is followed except that 10% sodium hydroxide solution is added at intervals to maintain the pH of the polymerizing emulsion at about 8, which otherwise tends to drop in view of the acidity of the N-oxidized monomer solution being fed in.

According to our preferred practice, the copolymer latex obtained in the above polymerization procedure is treated with acetic acid to form the acetic acid salt of the non-oxidized 2-(diethylamino)ethyl methacrylate units of the copolymer. The resultant latex is a good dispersant for paraffin wax, and the resultant aqueous dispersion, when padded onto cotton fabric to a pickup of 2% active ingredients (total organics) O.W.F., imparts to the fabric a high degree of water repellency, which has high durability to washing. This aspect of our invention is illustrated in further detail in Example 6 below.

Polymers of essentially the same high qualities, insofar as concerns the exhaust and non-gumming properties of aqueous wax dispersions prepared from the polymer, are obtained also if the procedure in this example is varied to the extent of using in the polymerization step 5 parts of the N-oxidized DEAM and 55 parts of basic DEAM, or, on the contrary, 24 parts of the N-oxidized monomer and 36 parts of the base. (Note: DEAM=2 diethylaminoethyl methacrylate.)

EXAMPLE 2.—N-OXIDATION OF A LATEX AFTER POLYMERIZATION

Using standard emulsion-polymerization technique (see for instance, Examples 1 and 2 of said copending application Serial No. 46,901) copolymer latexes of the following compositions were prepared.

The extent of actual oxidation does not always correspond to the above calculated equivalent percentages, probably due to partial decomposition of the peracetic acid, especially near the higher calculated equivalents; but where knowledge of the actual extent of oxidation is essential, it may be determined by titration with titanous citrate in isopropyl alcohol-acetic acid solution.

The other copolymer latexes in the table above may be N-oxidized in like manner partially or completely. When 40% peracetic acid solution is employed in quantity theoretically required to oxidize 50% of the total N-content of the copolymer, the resulting oxy-cationic copolymer in each case, when used to disperse wax as in Example 6a below, gives an aqueous wax-copolymer dispersion which exhausts well upon cotton and synthetic fibers in a home laundry apparatus, without leaving any visible gummy deposits on the parts of the machine.

EXAMPLE 3.—OXIDIZING DURING POLYMERIZATION

A suspension of the following ingredients is prepared:

| | Parts |
|---|---|
| Water | 200 |
| Monopotassium phosphate ($KH_2PO_4$) | 1.35 |
| Octadecyltrimethyl ammonium chloride | 4.5 |
| 2-(diethylamino)ethyl methacrylate | 30 |
| Octadecyl methacrylate | 70 |
| 2,2'-azobis(isobutyramidine)dihydrochloride | 0.2 |

The water is deaerated before entering the other ingredients, and the mass is brought to 65° C. After polymerization has begun, 3.1 parts of 40% peracetic acid solution is added slowly together with enough sodium hydroxide, 10% aqueous solution, to maintain the pH at about 8.5. After about six hours the polymerization is essentially complete, and the product contains about 10% of its total N-content in the hydroxyammonium state:

When incorporated with wax into an aqueous dispersion and when the latter is diluted and used to treat cotton fabric in a home laundry machine according to Example 7b below, it imparts a durable water-repellency finish to the fabric.

| Product | Monomer (1) | Monomer (2) | Ratio of (1):(2) by weight |
|---|---|---|---|
| A | 2-(Diethylamino)-ethyl methacrylate. | Octadecyl methacrylate. | 30:70 |
| B | ...do... | Butyl methacrylate. | 78:22 |
| C | ...do... | Methyl methacrylate. | 30:70 |
| D | 2-(diethylamino)-ethyl acrylate. | Dodecyl acrylate. | 30:70 |

To portions of the latex of the copolymer A, each containing 33.3 parts of the copolymer, were added at room temperature varying amounts of 40% peracetic acid solution. From 20 to 60 minutes were allowed for the oxidation.

The quantities of peracetic acid solution employed in these several oxidation experiments were as follows:

| Weight of peracetic acid, 40% solution | Equivalent percentage of the total N-atoms present |
|---|---|
| 0.51 | 5 |
| 1.54 | 15 |
| 2.56 | 25 |
| 5.13 | 50 |
| 10.25 | 100 |

EXAMPLE 4.—OXIDATION OF BULK COPOLYMERS AFTER POLYMERIZATION

Various mixtures of basic monomers (1) and alkyl methacrylates (2) as set forth in the table below were subjected to bulk polymerization according to the following procedure.

100 parts total of each mixture was charged to a nitrogen swept internal mixer. The mixture was heated to between 70° and 75° C., and 0.1 part of 2,2'-azobis-(isobutyronitrile) was added to initiate the polymerization. The reaction mass was held at 70° to 75° C. and under a blanket of nitrogen throughout the polymerization. In some cases additional 0.1-part quantities of the initiator were added at intervals, when the polymerization seemed to have become unduly retarded. The course of the latter was followed by measurement of the refractive index of the reaction mass and was checked for completion by infrared analysis for unreacted monomer. Monomeric alkyl methacrylates exhibit a strong band near 10.7μ.

The following mixtures were polymerized by the above procedure, to at least 92% conversion in a five-hour period.

| Product | Basic monomer (1) | Alkyl acrylate (2) | Ratio of (1):(2) by weight |
|---|---|---|---|
| $A_1$ | 2-(diethylamino)-ethyl methacrylate. | Octadecyl methacrylate. | 10:90 |
| $A_2$ | ----do---- | ----do---- | 20:80 |
| $A_3$ | ----do---- | ----do---- | 30:70 |
| $A_4$ | ----do---- | ----do---- | 50:50 |
| $A_5$ | ----do---- | ----do---- | 90:10 |
| B | ----do---- | Dodecyl acrylate | 30:70 |
| $C_1$ | ----do---- | Octyl methacrylate | 10:90 |
| $C_2$ | ----do---- | ----do---- | 30:70 |
| $C_3$ | ----do---- | ----do---- | 50:50 |
| $C_4$ | ----do---- | ----do---- | 90:10 |
| D | ----do---- | Methyl methacrylate | 30:70 |
| E | 2-(dimethylamino)-ethyl methacrylate. | Dodecyl acrylate | 30:70 |
| F | ----do---- | Octyl methacrylate | 50:50 |
| $G_1$ | ----do---- | Butyl methacrylate | 15:85 |
| $G_2$ | ----do---- | ----do---- | 30:70 |
| $G_3$ | 2-(dimethylamino)-ethyl methacrylate. | Butyl methacrylate | 50:50 |
| H | 2-(N-phenyl-N-ethylamino) ethyl methacrylate. | Octadecyl methacrylate. | 36:64 |
| I | Morpholinoethyl methacrylate. | ----do---- | 30:70 |
| J | 3-(dibutylamino)propyl methacrylate. | ----do---- | 38:62 |

Each of the above copolymers was converted to its amine oxide by reacting the copolymer with various quantities of peracetic acid corresponding in moles to one or more of the ratios 1.00, 0.75, 0.5, or 0.25 with respect to the moles of basic monomer (1) in the copolymer.

The treatment with peracetic acid may be carried out directly upon the bulk copolymer in the mixer in which they are produced. But it may be carried out also on an organic solution or an aqueous dispersion of the copolymer, or on a solution of the copolymer in dilute aqueous acetic acid. In our tests on the copolymers of the above table, these methods were variously employed, to establish the operability of each one of them. This is illustrated in the following procedures:

EXAMPLE 4a.—ORGANIC SOLVENT SOLUTIONS

Portions of copolymer $A_3$ were dissolved in various solvents, including isopropyl alcohol, t-butyl alcohol, heptane, chloroform, toluene and molten paraffin wax, and in concentrations varying from 15 to 80% by weight. To the solutions thus obtained, quantities of peracetic acid were variously added, corresponding in moles to 25%, 50%, 75% or 100% of the number of N-atoms contained (according to calculation) in the copolymer.

EXAMPLE 4b.—AQUEOUS DISPERSION 100 parts of copolymer $A_3$ were mechanically dispersed in hot water, and treated, under agitation and while hot, with 31 parts of 40% peracetic acid solution. The latter quantity corresponds mole for mole to the quantity of basic monomer used in forming the copolymer. Analysis showed the copolymer to contain hydroxyammonium radicals to an extent between 65 and 70% of its original amine content.

EXAMPLE 4c.—AQUEOUS SOLUTION OF A SALT 100 parts of copolymer $A_3$ were treated in a mixer with 19 parts of acetic acid, and the mass was then diluted with 500 parts of water. To the resulting solution of copolymer acetate in water were added 31 parts of 40% peracetic acid solution. The extent of actual N-oxidation as determined by analysis was about the same as in Example 4b.

EXAMPLE 5

A polymerization vessel was charged with 27 parts of 2-(dimethylamino)ethyl methacrylate, 73 parts of octadecyl methacrylate, and 25 parts of t-butyl alcohol. Polymerization under nitrogen at 73° to 75° C. was initiated with 2,2'-azobis(isobutyronitrile), which was added in 0.1 part portions at 0, 2 and 4 hours. In 5 hours the conversion was 95%, and the copolymer was isolated by precipitation with methanol. It had an intrinsic viscosity in chloroform at 30° C. of 1.22. Portions of the above copolymer of 100 parts by weight each were treated with 17 parts of 40% peracetic acid solution (equivalent to 50% of the N-content of the copolymer) by the three methods indicated in Examples 4a, 4b and 4c, namely:

(a) In the same solvent in which the copolymer was prepared;
(b) In aqueous dispersion, and
(c) In aqueous solution of the acetate.

In another experiment, a similar copolymerization in t-butyl alcohol solution was carried out, using 30 parts of 2-(diethylamino)ethyl methacrylate and 70 parts of octadecyl methacrylate. The resulting copolymer had an intrinsic viscosity at 0.9 and was converted to its amine oxide by treatment in its t-butyl alcohol solution with a molar equivalent of peracetic acid.

In the following additional examples, the modes of procedure in preparing and using the novel wax-copolymer emulsions are given in detail for the purpose of illustration and without any intent to limit this invention.

EXAMPLE 6.—INCORPORATION WITH WAX INTO AQUEOUS CONCENTRATES (a) Starting with an aqueous emulsion 100 parts of an N-oxidized latex as obtained for instance, in Example 2 and containing 29 parts of the copolymer is diluted with 100 parts of water, placed in a vessel fitted with an efficient agitator and heated to between 65° and 70° C. 87 parts of molten paraffin wax are now added.

The mixture is then passed through a high speed turbine pump to reduce the particle size of the dispersed wax to 10 microns or below. Next, the mixture is passed through a high pressure homogenizer, wherein the particle size is reduced to one micron or less. The resultant wax emulsion is then diluted with 200 parts of water to give a concentrate of 24% solids. The latter is readily dilutable with water to any desired degree, such as 2% solids content (for padding) or 6% (for use in a home laundry), and yields stable dispersions in each case.

*(b) Starting with solution in a water-miscible solvent*

87 parts of molten paraffin wax are added to 29 parts of N-oxidized polymer dissolved, for instance, in 8 parts of t-butyl alcohol (Example 5). The resulting solution is poured into 400 parts of hot water contained in a vessel equipped with an efficient agitator. The mixture is then run through a high speed turbine pump and a high pressure homogenizer, as in Example *a* above.

*(c) Starting with a copolymer in bulk*

96 parts of molten wax are poured over 32 parts of the N-oxidized copolymer in bulk, as obtained for instance in Example 4. The molten mixture is then poured into 400 parts of hot water contained in a vessel equipped with an efficient agitator, and the remainder of the procedure is then as in Examples *a* and *b* above.

*(d) Starting with a solution in a water-immiscible solvent*

The N-oxidized copolymer in this case is typified by the product obtained in Example 4a, using heptane as solvent. In such a case, the solvent is evaporated off, and the residual copolymer is treated as in Example *c* above.

EXAMPLE 7.—APPLICATION TO FABRIC

*(a) By padding procedure*

A portion of the 24%-solids copolymer-wax emulsion obtained in Example 6a above is diluted with water to an optional concentration of between 2 and 4% by weight. Fabric is padded in the diluted bath and squeezed to a 100% pickup. The fabric is then heated at 175° C. for 10 minutes.

In actual tests according to the above procedure, cotton poplin acquired water-repellency to an initial spray rating of 100, which dropped down to 80 after 10 standard washes.

*(b) Application in home-type automatic washer*

80 grams of the 24%-solids concentrate as obtained in Example 6a above are added to a home-type automatic washer of 17 gals. capacity, filled with hot water (about 125° F.). 2 pounds of fabric are then added (which may be cotton, wool, silk, polyester fabric, nylon, acrylic fabric, acetate rayon, etc.); the washer is operated with agitation for 12 minutes, and the water is drained. The fabric is then dried in an automatic home drier set at its maximum operating temperature. Alternatively, the fabric may be air dried and then ironed, to effect fixing of the water-repellency agent on the fabric.

Fabric treated as above generally has an initial spray rating of 80 to 100. The machine ends up free of waxy or gummy deposits, and is readily cleaned just by rinsing with water. By contrast, if the copolymer employed contains no N-oxidized groups, the inner walls of the machine and the agitator blade are found to be contaminated with a heavy, sticky deposit of wax-polymer which is difficult and unpleasant to remove.

EXAMPLE 8.—OXIDATION OF THE COPOLYMER AFTER INCORPORATION OF THE WAX

Portions of copolymer-latex A obtained in Example 2 above (prior to treatment with peracetic acid) were dispersed in water with paraffin wax and acetic acid, in the proportions and by the procedure set forth above in Example 6a.

Portions of the resulting copolymer-wax dispersions were now reacted with 40% peracetic acid solution in the manner set forth in Example 2, the quantities of peracetic acid being theoretically equivalent, in the various experiments, to 5, 15, 25, 50 and 100% of the N-atoms present in the copolymer.

The calculations, of course, assumed complete consumption of the peracetic acid in the reaction

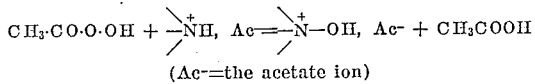

(Ac⁻=the acetate ion)

but no assertion is intended hereby that the assumption is strictly true, inasmuch as part of the peracetic acid usually decomposes and is expended in side reactions, particularly, when its quantity approaches or exceeds the 50% equivalent value.

The resulting N-oxidized copolymer-wax dispersions, as well as a sample of the non-oxidized dispersion, were then tested in a home-type washing machine on cotton poplin fabric, as in Example 7b above. All samples of the cotton fabric thus obtained exhibited a spray rating of 100. The extent of fouling of the apparatus with gummy deposits decreased with increasing oxidation and was essentially zero when the quantity of peracetic acid was theoreticaly equivalent to 50%.

When the other copolymer-latexes obtained in Example 2 were similarly tested, they led to similar results. Latexes C and D led to initial spray ratings of 90. The wax suspension prepared from latex B imparted to cotton an initial spray rating of 70 to 80, with no gummy depositions when a 100% equivalent quantity of peracetic acid was employed.

In like manner, the copolymers prepared in bulk in Example 4 may be dispersed in water with wax prior to oxidation, and the copolymer-wax dispersions may then be treated with peracetic acid to achieve various degrees of N-oxidation. Of the resulting aqueous dispersions, those whose copolymer contains from 20 to 80% by weight of the basic monomer and which are oxidized to an N-equivalent of 50 to 100% leave an essentially clean machine when applied to fabric by the method of Example 7b above.

Moreover, essentially the same results are obtained if only a portion of the aqueous wax-copolymer dispersion is oxidized and admixed with another portion of the same dispersion that has not been oxidized, provided the average calculated N-oxidation of the mixture is of the order of 50% or more.

EXAMPLE 9.—QUATERNIZATION

The quaternization step, where desirable, may be introduced into our novel copolymers in several different manners. For instance, one may start with a partially quaternized nitrogenous monomer in the procedure of Example 1. Or one may partially quaternize any of the latices produced in Example 2 before N-oxidation. Or again, one may react with a quaternizing agent upon the N-oxidized copolymer produced in any of the examples above.

The results are not identical. A quaternized N-atom does not lend itself to oxidation. On the other hand, an N-oxidized atom can be quaternized, producing a radical of the form

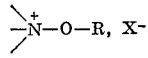

as already indicated above. The following additional examples illustrate the steps of procedure.

EXAMPLE 9a.—QUATERNIZATION BEFORE OXIDATION

A portion of the latex D from Example 2 containing 100 parts of copolymer is mixed with 11 parts of dimethyl sulfate (equivalent to half of the tertiary N-atoms) and an equivalent quantity of sodium hydroxide, and allowed to stand until the dimethyl sulfate has reacted, as shown by test. The other half of the nitrogen atoms are then oxidized with 17 parts of 40% peracetic acid solution, as described in Example 2.

Polymers prepared in solvents, such as those in Example 5, can be quaternized and then oxidized in the same manner.

EXAMPLE 9b.—QUATERNIZATION AFTER OXIDATION

The polymer of Example 5, prepared and oxidized with 50% of the theoretical peracetic acid in t-butyl alcohol, may be quaternized with benzyl chloride in the same solvent. Use of a molar equivalent of benzyl chloride, based on the nitrogen content, will yield a copolymer containing both groups, $R_3N^+$—$CH_2C_6H_5$ and $$R_3N^+\text{—}O\text{—}CH_2C_6H_5$$

It will be understood that the details of the above examples may be varied widely within the skill of those engaged in this art. For instance, beside the three essential ingredients, namely water, wax and cationic polymer, the marketable concentrates of this invention may also contain other ingredients where speically desired, for instance wax-modifiers such as polyvinyl acetate. Also, while the examples above produce marketable concentrates of 24% solids by weight, it is clear that the marketable composition can be finished off to any other desired solids-content. For practical purposes, concentrations of 5 to 50% solids are preferred.

Again, while we have illustrated the preparations of our novel copolymer using as monomer (2) an undiluted alkyl acrylate, part of the latter up to 20° by weight may be diluted, for economical reasons, with styrene, vinyl chloride, acrylonitrile or other inexpensive neutral and monoolefinic monomers.

Wherever peracetic acetic solution is named in the above examples, it may be replaced by an equivalent quantity of persulfuric acid, peroxyformic acid or any other of the acids named hereinabove, these being dissolved in aqueous acid or organic acid, respectively, each according to its natural or most practical solubility.

Finally, while the above examples emphasize particularly the use of our novel polymeric materials as aids in forming aqueous wax dispersions for water-repellency purposes, they are useful as dispersing agents in general, and may be applied for instance to disperse in water agricultural chemicals (insecticides, herbicides, etc.), to prepare aqueous pigment pastes, and in other similar fields.

The above examples deal mostly with the acidified and quaternized forms of our novel N-oxidized copolymers. The free base form may be readily obtained from these by treatment with alkali. For instance, sodium hydroxide may be added to the N-oxidized latex obtained in Example 2, following which acetone or methanol may be added to the latex to coagulate and precipitate the copolymer. The latter is a colorless semi-solid, of much greater viscosity than the free-base copolymer obtained in like manner from the corresponding non-oxidized latex. Chemically its characteristic N-radical may be represented by the structure

or

either of which is commonly referred to as the amine-oxide form. The base form will also be formed in situ whenever our novel copolymers are used, say as dispersants, under alkaline conditions.

It will be noted incidentally that there is no general agreement in the literature, at this date, as to the correct way of formulating the amine-oxide structure. Accordingly, it will be understood that the formulas

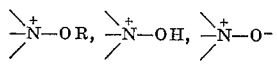

and

wherever used hereinabove or in the claims below are meant as symbols for the N-oxy-cationic state, whatever its actual structure in nature may be.

In the definition of Formula 1 above, it has been indicated that $R_2$ may be the divalent aliphatic radical

Compounds of this type are obtained by reacting one mole of glycidyl arcylate (or methacrylate) with, for instance, one mole of diethylamine (or any other amine as defined under Q). N-oxidized copolymers prepared according to this invention from the resulting basic monomer have been found to give, in practical application, essentially the same results as obtained with other values of $R_2$ in the above specific examples.

We claim as our invention:

1. A polymeric material selected from the group consisting of a copolymer, salt and quaternization product of said copolymer containing oxidized amine radicals in cationic state, said copolymer being made up of $n$ percent by weight of a nitrogenous acrylic monomer of the formula $$CH_2=C-C-O-R_2-Q$$
$$\phantom{CH_2=}\,R_1\ \,O$$

and ($100-n$) percent by weight of neutral monoolefinic monomers of which not less than 80% consist of acrylic ester units of the formula $$CH_2=C-C-O-R_5$$
$$\phantom{CH_2=}\,R_1\ \,O$$

$n$ having a value of 10 to 90, $R_1$ in said formulas being selected from the group consisting of H and $CH_3$, $R_2$ being a divalent aliphatic radical selected from the group consisting of $C_2H_4$, $C_3H_6$, $C_4H_8$ and

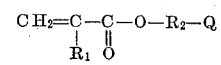

$R_5$ being an aliphatic hydrocarbon radical of 1 to 22 C-atoms, and Q being an amino radical of the group consisting of dialkylamines having a total of 2 to 26 C-atoms, monoalkyl-monoarylamines having a total of 7 to 16 C-atoms, and secondary heterocyclic amines being members of the group consisting of 5-membered and 6-membered heterocyclic amines and from 6% to 100% of said Q being in an N-oxy-cationic state symbolically represented by the formula

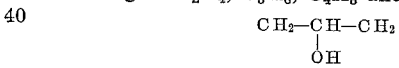

wherein said R stands for a member of the group consisting of hydrogen, alkyl and aralkyl, said $X^-$ is a water-soluble anion.

2. A polymeric material as in claim 1, wherein the radical Q which is not in the N-oxy-cationic state is present in the form of a salt of a water-soluble acid.

3. A polymeric material as in claim 1, wherein the radical Q which is not in N-oxy-cationic state is present in the form of a quaternary salt.

4. A polymeric material selected from the group consisting of a copolymer salt and quaternization product of said copolymer made up of 10 to 90% by weight of a dialkyl-aminoethyl methacrylate in which the alkyl radicals contain no more than 4 C-atoms each, and 90% to 10%, respectively, of an alkyl methacrylate whose alkyl radical contains from 1 to 22 C-atoms, 6% to 100% of the dialkylamino radicals in said first mentioned methacrylate being in the N-oxy-cationic state.

5. A polymeric material selected from the group consisting of a copolymer, salt and quaternization product of said copolymer made up of 10 to 90% by weight of a dialkylaminoethyl methacrylate in which the alkyl radicals contain no more than 4 C-atoms each, and 90% to 10%, respectively, of an alkyl acrylate whose alkyl radical contains from 1 to 22 C-atoms, 6% to 100% of the dialkylamino radicals in said methacrylate being in the N-oxy-cationic state.

6. A polymeric material made up of 20 to 50% by weight of diethylaminoethyl methacrylate and 80 to 50% of octadecyl methacrylate, wherein from 6% to 100% of the diethylamino radicals are in the hydroxy-cationic state, while any remaining diethylamino radicals are in the form of their salt with acetic acid.

7. A polymeric material made up of 20 to 50% by weight of diethylaminoethyl methacrylate and 80 to 50% of dodecyl methacrylate, wherein from 6% to 100% of the diethylamino radicals are in the hydroxy-cationic state, while any remaining diethylamino radicals are in the form of their salt with acetic acid.

8. A polymeric material selected from the group consisting of a copolymer, salt and quaternization product of said copolymer containing oxidized amine radicals in cationic state, said copolymer being made up of 20 to 80% by weight of a nitrogenous acrylic monomer of the formula

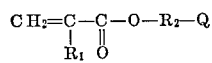

and 80 to 20% by weight of a neutral acrylic acid ester of the formula

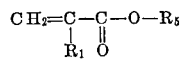

$R_1$ in said formulas being selected from the group consisting of H and $CH_3$, $R_2$ being a divalent aliphatic radical selected from the group consisting of $C_2H_4$, $C_3H_6$, $C_4H_8$ and

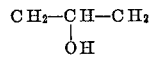

$R_5$ being an aliphatic hydrocarbon radical of 1 to 22 C-atoms, and Q being an amino radical of the group consisting of dialkylamines having a total of 2 to 26 C-atoms, monoalkyl-monoarylamines having a total of 7 to 16 C-atoms, and secondary heterocyclic amines being members of the group consisting of 5-membered and 6-membered heterocyclic amines having a secondary N-atom, and from 6% to 100% of said Q being in an N-oxy-cationic state corresponding to the formula

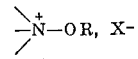

wherein R stands for a member of the group consisting of hydrogen, alkyl and aralkyl, said $X^-$ is a water-soluble anion.

9. A composition of matter consisting of a storage-stable aqueous suspension of a water-insoluble, physically acting water-repellency agent and of a copolymer as defined in claim 8, the total organic matter in said aqueous composition being from 5% to 50% by weight of the whole and the weight of said copolymer being from 0.02 to 1.0 times the weight of said water-repellency agent.

10. A composition as in claim 9, wherein said water-insoluble, physically acting water-repellency agent is a wax.

11. A composition as in claim 9, wherein said water-insoluble, physically acting water-repellency agent is a hydrocarbon wax.

References Cited by the Examiner
UNITED STATES PATENTS

| | | | |
|---|---|---|---|
| 2,138,763 | 11/1938 | Graves | 260—86.1 |
| 2,694,688 | 11/1954 | Hughes | 260—29.6 |
| 2,913,427 | 11/1959 | Michaels | 117—135.5 |

MORRIS LIEBMAN, *Primary Examiner.*

MILTON STERMAN, *Examiner.*